(12) United States Patent
Terry et al.

(10) Patent No.: US 7,120,852 B2
(45) Date of Patent: Oct. 10, 2006

(54) METHOD AND APPARATUS FOR PACKET AGGREGATION IN A WIRELESS COMMUNICATION NETWORK

(75) Inventors: John Terry, Garland, TX (US); Jari Jokela, Ylöjärvi (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/880,379

(22) Filed: Jun. 28, 2004

(65) Prior Publication Data
US 2005/0015703 A1 Jan. 20, 2005

Related U.S. Application Data

(60) Provisional application No. 60/483,588, filed on Jun. 27, 2003.

(51) Int. Cl.
*H03M 13/00* (2006.01)

(52) U.S. Cl. .................. 714/776; 714/746; 714/752

(58) Field of Classification Search ............. 714/752, 714/746, 747, 748, 749; 370/231, 242; 455/62, 455/450, 563
See application file for complete search history.

(56) References Cited

U.S. PATENT DOCUMENTS 5,970,062 A 10/1999 Bauchot

| | | | | |
|---|---|---|---|---|
| 6,038,216 A | * | 3/2000 | Packer | 370/231 |
| 6,052,594 A | * | 4/2000 | Chuang et al. | 455/450 |
| 6,496,481 B1 | * | 12/2002 | Wu et al. | 370/242 |
| 6,738,599 B1 | * | 5/2004 | Black et al. | 455/62 |
| 6,901,270 B1 | * | 5/2005 | Beach | 455/563 |

OTHER PUBLICATIONS

Daniel Roth, *Bittorrent: The Great Disrupter*, Fortune Magazine, 9 pages, Available at http://ww.fortune.com/fortune/print/0.15935.1117681.00.html, visited Nov. 3, 2005.

* cited by examiner

*Primary Examiner*—Guy Lamarre
*Assistant Examiner*—Fritz Alphonse
(74) *Attorney, Agent, or Firm*—Alston & Bird LLP

(57) ABSTRACT

A method and apparatus for aggregating packets in a wireless communication system. The data to be transmitted is selected and packetized and formed into frames for transmission. Rather than send each frame individually, frames are grouped and transmitted with grouping indicia informing the recipients how to acknowledge successful receipt of the transmitted data. ACKs are sent at a predetermined time, or all together, divided by subcarrier in the case of an OFDMA network.

26 Claims, 19 Drawing Sheets

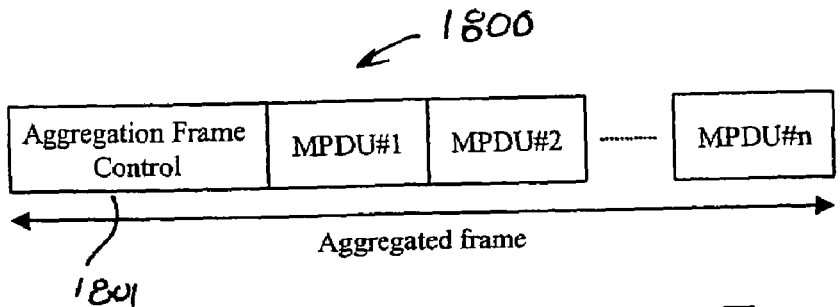

FIGURE 18

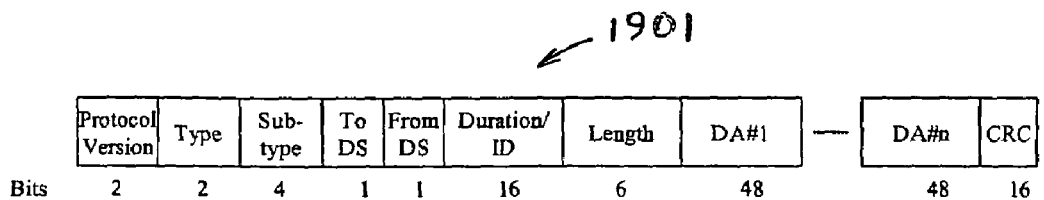

FIGURE 19

| Value | Description |
|---|---|
| 0000 | Aggregated MPDUs targeted to single destination. In infrastructure mode, STA shall always use this value (i.e., all the aggregated MPDUs/MMPDUs are targeted to AP). In this case only DA#1 is present. |
| 0001 | Aggregated MPDUs/MMPDUs targeted to multiple destinations. In this case all the DA fields are present. |
| 0010-0111 | Reserved |
| 1000 | Aggregated OFDMA ACK frame (see 4) |
| 1001-1111 | Reserved |

| Bits 0-13 | Bit 14 | Bit 15 | Usage |
|---|---|---|---|
| 0 – 32767 | | 0 | Duration value (in units of microseconds) within all frames other than PS-Poll frames transmitted during the CP, and under HCF for frames transmitted during the CFP. |
| 0 | 0 | 1 | Fixed value under PCF within frames transmitted during the CFP. |
| 1 - 16383 | 0 | 1 | Reserved |
| 0 | 1 | 1 | Reserved |
| 1-2007 | 1 | 1 | AID in PS-Poll frames |
| 2008 - 16383 | 1 | 1 | Reserved |

| To DS | From DS | MPDU Address 1 | MPDU Address 2 | MPDU Address 3 | MPDU Address 4 | DA in Aggregation Frame Control field |
|---|---|---|---|---|---|---|
| 0 | 0 | DA | SA | BSSID | N/A | DA |
| 0 | 1 | DA | BSSID | SA | N/A | DA |
| 1 | 0 | BSSID | SA | DA | N/A | BSSID |
| 1 | 1 | RA | TA | DA | SA | RA |

FIGURE 22

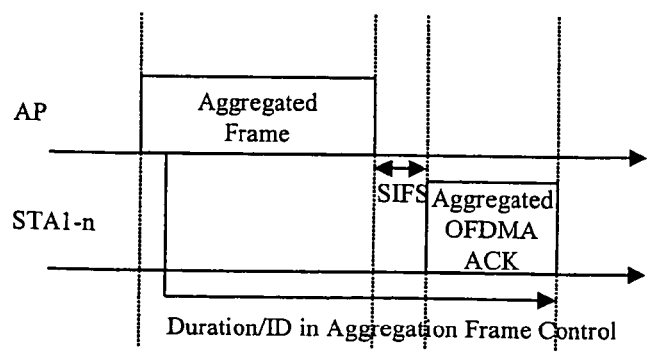

FIGURE 23

| Frame Control | RA | FCS |
|---|---|---|
| 2 | 6 | 4 |

Octets

| Number of aggregated MPDUs/MMPDUs | Subcarrier allocation |
|---|---|
| 2 | |
| User 1 | [-26, -22], [-20, -8], [-6, -1] |
| User 2 | [1, 6], [8, 20], [22, 26] |
| 3 | |
| User 1 | [-26, -22], [-20, -10] |
| User 2 | [-9, -8], [-6, -1], [1, 6], [8, 9] |
| User 3 | [10, 20], [22, 26] |
| 4 | |
| User 1 | [-26, -22], [-20, -14] |
| User 2 | [-13, -8], [-6, -1] |
| User 3 | [6, 1], [8, 13] |
| User 4 | [14, 20], [22, 26] |
| 5 | Not used |
| 6 | |
| User 1 | [-26, -22], [-20, -18] |
| User 2 | [-17, -10] |
| User 3 | [-9, -8], [-6, -1] |
| User 4 | [1, 6], [8, 9] |
| User 5 | [10, 17] |
| User 6 | [18, 20], [22, 26] |
| 7 | Not used |
| 8 | |
| User 1 | [-26, -22], [-20] |
| User 2 | [-19, -14] |
| User 3 | [-13, -8] |
| User 4 | [-6, -1] |
| User 5 | [1, 6] |
| User 6 | [8, 13] |
| User 7 | [14, 19] |
| User 8 | [20], [22, 26] |

METHOD AND APPARATUS FOR PACKET AGGREGATION IN A WIRELESS COMMUNICATION NETWORK

CLAIM OF PRIORITY

This application is related to and claims the benefit of the filing date of U.S. Provisional Patent Application No. 60/483,588, filed 27 Jun. 2003.

FIELD OF THE INVENTION

The present invention relates generally to the field of wireless data transmission, and more specifically to a method, and an associated apparatus, for transmitting a plurality of data packets in aggregation.

BACKGROUND OF THE INVENTION

Data transmission is becoming increasingly common, and data is being transferred for more reasons and in more ways than ever before. In the context of the present invention, data are bits of information required to perform a task of some kind in an electronic device. Data transmission refers to the transfer of this information from one device (or component of a device) to another.

Traditionally, computers have stored data, whether input manually by human operators or automatically collected in some fashion, to be able to produce reports, make calculations, or simply to store information for later reference. Data may also be processed to produce more sophisticated presentations—audio, video, or "multi-media"—or to operate mechanical devices through a proper interface.

The reason for wanting to transmit data should be apparent. Data collected in one place, or in many places, may be sent to another location for safekeeping or to perform a task there. Or the data may simply be used for personal communication, as occurs with email. The human voice (and other sounds) can, in fact, be converted into transmittable data as well. Note that while data information and voice information are often treated separately because they impose somewhat different demands on a transmission channel, for purposes of describing the present invention, "data transmission" will be used to describe the sending of any type of information content unless a distinction is explicitly stated or apparent from the context.

The current popularity of data transmission has been promoted by a variety of interconnected phenomena. One factor naturally is the widespread availability of computing devices to the general public. These devices may take the form of personal computers, cell phones, personal digital assistants, and so forth. Correspondingly, the amount of information available for transmission has increased. This includes not only the personal correspondence (such as email) mentioned above, but a wealth of text, graphics, and other types of files that can be requested by a user and returned in a very short period of time. The World Wide Web, in particular, makes a vast quantity of such information available. Finally, as might be expected, this growing use of an increasing amount of information content is supported by a number of communications, networks and systems. These many data transmission channels, along with their respective schemes and protocols, are always evolving in an attempt to provide faster and more reliable means of data communication.

The first communication channels for data transmission were, of course, wires and cables of a conducting material such as copper. Data transmission may occur through a dedicated line, or series of lines, extending from one computing device to another. Connection may also be made via a network such as the public-switched telephone network (PSTN) or, more recently, the Internet, where a circuit for communication may be set up as needed. Ad hoc communication circuits may be established using mechanical switches to connect existing lines. They may also be created logically using routers with software switches determining where certain information should be sent from a number of semi-permanently existing choices. The same principles may be used on a smaller scale, such as between offices of a particular office building, using a local area network (LAN).

Naturally, the data must be converted into a suitable form for transmission—encoded in some fashion recognizable to the intended recipient. There are many methods for doing so. In some systems, the data is organized into discreet units called packets, and each packet is individually transmitted. Each data packet must be separately addressed so that it can be routed to its destination by the most efficient route. Each packet must also contain identifying information so that the packets can be reassembled in the proper order at their destination. This extra information, required for transmission but then discarded, is sometimes referred to as "overhead". Other types of overhead may include error-checking information, used in an error-checking algorithm at the receiver to determine if the packet has been correctly received. System design may include an acceptable error rate, this rate in part defining the quality of service (QoS) of the system. An increase in the acceptable error rate would normally be made to increase transmission speed. Different applications have different QoS requirements. Unsuccessfully transmitted packets may be retransmitted if the transmitting stations become aware of the transmission failure. Depending on the system's design, the receiver may send an acknowledgment message (ACK) to notify the transmitter that the data has been properly received, or send a negative acknowledgment message (NAK) if not. In some systems, both ACK and NAK messages may be used. Delay in the transmission of information is also an important factor in determining QoS. As described below, the present invention is directed at improving both of these QoS parameters.

A communication channel increasing in popularity is the wireless link, which is able to transmit data over an air interface using electromagnetic radiation in the radio frequency range. As with other links, these wireless channels are becoming more efficient and therefore more desirable. In addition, of course, a wireless link enables mobility. Sending and receiving stations are not confined to a fixed site or to a site with a wire-based network access. A cellular telephone network is one example of a system that transmits data over a wireless air interface. Note, however, that in such a network the path taken by transmitted data from source to destination is only in part an air interface. Wireless access in cellular networks is only used for subscribers to gain access to the network infrastructure.

Another example of a system using an air interface is a wireless local area network (WLAN). FIG. 1 is a simplified block diagram illustrating selected components of an exemplary WLAN 10. The WLAN 10 of FIG. 1 includes four stations, enumerated 1 through 4, and an access point 5. Each of the stations is operable to communicate with the access point over one or more radio-frequency links. The transmission channel from the access point 5 to one or more of the stations is typically referred to as the downlink, and transmissions in the other direction the uplink.

Note that in the configuration of FIG. 1, as with the cellular network referred to above, access point 5 is fixed and connected to a larger network, perhaps one that includes other access points. Such an application may be useful, for example, in a university where access points at various physical locations permit students and faculty to establish a network connection using wireless communication.

The set of stations shown in FIG. 1, which may vary in number, is sometimes referred to as a basic service set (BSS) and, including the access point 5, as an infrastructure BSS (If-BSS). A number of If-BSSs may be connected together to form an extended service set (ESS) (not shown). The network may even have the capability of "handing over" communications with a station from one access point to another, so that users may physically relocate during a communication session with little or no interruption. In addition to other If-BSSs, stations in WLAN 10 may also have access to larger central computers and more widespread networks, such as the Internet.

The WLAN of FIG. 1 is only exemplary, of course, and other network configurations are possible. Some networks may be set up on an ad hoc basis and establish communication between a number of nodes without a fixed (or pre-designated) access point. The stations may in some networks be operable to communicate directly with each other as network, and in such cases the access point may be is unnecessary. Such a network may be referred to as an independent BSS (IBSS). Yet another type of network is a mesh network, where various of the communication stations present may in a sense act as routers, allowing two or more stations to communicate (at lower power) through intermediaries rather than directly with each other. The present invention may be applied in any of these networks and the illustrations above are intended to be illustrative rather than limiting.

While the wireless air interface provides the advantage of mobility, it presents challenges in terms of increasing capacity without sacrificing QoS. By their nature, radio links may have a greater risk of signal distortion and lost data than a conductive wire or fiber-optic cable.

Nevertheless, as wireless communication grows in popularity, greater demands are being placed on the air interface. New techniques for more efficiently and reliably transmitting data are constantly in demand. The present invention provides such an improvement.

SUMMARY OF THE INVENTION

The present invention is directed to a method and an associated apparatus for grouping packetized data into transmission frames for more efficient wireless transmission. In one aspect, the present invention is a method of communicating information including the steps of packetizing the data, selecting a group of the data packets, and assembling a transmission frame including the selected packets along with grouping indicia so that the recipients of each transmission frame will be able to extract the data intended for them. The grouping indicia may simply include an address for the intended recipient or recipients. In some systems, the CRC field may include a value permitting non-recipient stations to sleep during the aggregated data exchange. The grouping indicia may also take the form of a transmission map inserted between the PLCP header and the data part of a transmission frame. The grouping indicia may also include acknowledgment instructions so that each recipient knows when and how to acknowledge receipt of the packets intended for it. In an OFDMA WLAN, the acknowledgment instructions may include the assignment of subcarrier subset for use in transmitting ACK messages. In an alternate embodiment, subcarrier assignments are fixed by design, or determined by the number of frames transmitted.

In another aspect, the present invention is an access point for use in a WLAN including a packet selector for selecting data packets, a grouping-indicia generator for generating information regarding how the selected packets are aggregated into a transmission frame, a transmission frame assembler for assembling the transmission frame including the selected packets and the grouping indicia. The grouping indicia may include acknowledgment instructions for informing each recipient station how to acknowledge receipt of its respective data packets, in which embodiment the access point further includes an acknowledgment-instruction generator.

In yet another aspect, the present invention is a mobile station for use in a WLAN, including a grouping indicia detector for detecting when a received transmission frame contains aggregated data, a data extractor for extracting from such a frame the data intended for the mobile station, and an acknowledgment generator for generating an acknowledgment message according to the acknowledgment instructions, if any, included in the transmission frame.

In yet another aspect, the present invention is a mobile station for use in an independent BSS (IBSS) lacking a fixed or ad hoc access point, including a packet selector for selecting data packets, a grouping-indicia generator for generating information regarding how the selected packets are aggregated into a transmission frame, a transmission frame assembler for assembling the transmission frame including the selected packets and the grouping indicia; as well as a grouping indicia detector for detecting when a received transmission frame contains aggregated data, a data extractor for extracting from such a frame the data intended for the mobile station, and an acknowledgment generator for generating an acknowledgment message according to the system requirements or the acknowledgment instructions, if any, included in the transmission frame.

A more complete appreciation of the present invention and the scope thereof can be obtained from the accompanying drawings that are briefly summarized below, the following detailed description of the presently-preferred embodiments of the present invention, and the appended claims.

BRIEF DESCRIPTION OF THE DRAWINGS

FIG. 8 is a time-flow diagram illustrating a data-transmission sequence according to an embodiment of the present invention.

FIG. 18 illustrates the format of an aggregated frame according to an embodiment of the present invention.

FIG. 19 illustrates the contents of the aggregation frame control field.

FIG. 20 is a table illustrating values for the Subtype field in accordance with the present invention.

FIG. 21 is a table illustrating values for encoding the Duration/ID field according to an embodiment of the present invention.

FIG. 22 is a table illustrating values for the DA field content according to an embodiment of the present invention.

FIG. 23 is a time flow diagram illustrating an aggregated frame exchange with an aggregated OFMDA ACK in accordance with an embodiment of the present invention.

DETAILED DESCRIPTION OF THE PRESENT INVENTION

The present invention is directed to a method, and an associated apparatus, for aggregating data packets into multi-packet frames for transmission. Increases in efficiency and reliability have been observed in simulated wireless local area network (WLAN) applications employing the present invention. Some results of these simulations are provided in an Appendix hereto, however, no particular result is required by the claims unless explicitly recited.

The present invention, generally speaking, is implemented in the medium access control (MAC) logical layer and at the MAC-layer and physical-layer interface. These terms refer to the logical-layer organization scheme of the ISO-OSI Model (illustrated in FIG. 2). This model has its variants, however, and it is understood that when its terms are used herein they are intended to encompass similar functions or layers in other schemes as well.

Figure 2:
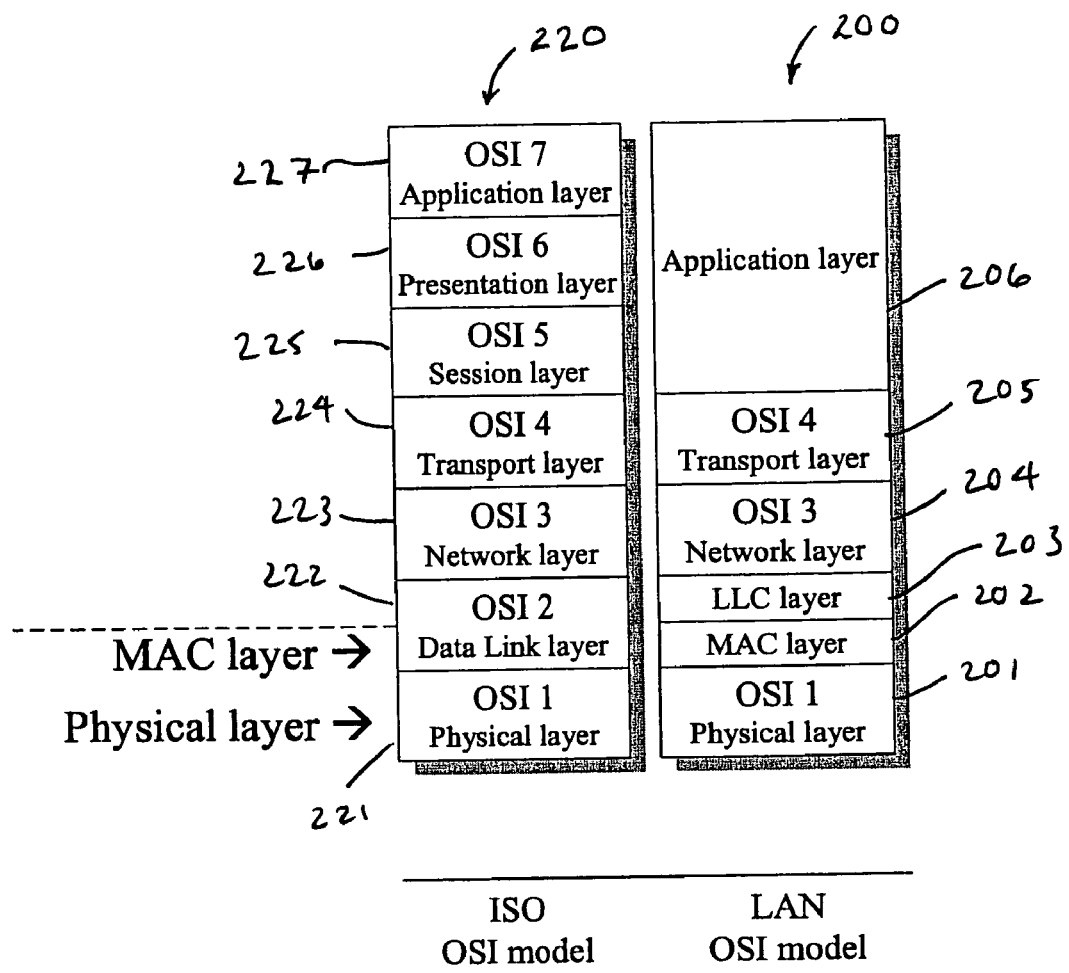
FIG. 2 is a chart illustrating the layers used to describe the structure of operation of a typical scheme for the transmission of data in a network such as the WLAN of FIG. 1.

For example, FIG. 2 is a chart to illustrate the structure of a typical scheme for the transmission of data in a WLAN. Note that any two communicating devices will typically each have a transmitter and receiver. In this case, the same layered approach is applicable to both. Briefly, in the traditional ISO/OSI (International Standard Organization/Open System Interconnect) model 220, an application layer 227 provides network services to the end user, and interfaces with user applications. Presentation layer 226 converts local representation of data into canonical form and vice versa. Session layer 225 manages communications between the communicating device and communication network. Transport layer 224 subdivides the data into segments (datagrams) for transmission, and reassembles a received data stream. Network layer 223 handles the routing of the data. The data link layer 222 puts datagrams into packets for transmission. Physical layer 221 defines the actual transmission channel.

A similar model adapted from the OSI model 220 and referred to in FIG. 2 as the LAN/OSI model 200 incorporates the upper three layers 225–227 of the ISO/OSI model 220 in the application layer 206. LAN/OSI model 200 also illustrates how the data link layer 222 of the OSI model 200 is subdivided into the logical link control (LLC) layer 203 and the MAC layer 202 in LAN/OSI model 200. From an organizational perspective, the present invention operates in large part at the interface of the MAC (sub) layer and the physical layer. The LLC (sub) layer 203 performs data link layer functions with respect to the network layer 204, such as maintaining the network link. The MAC (sub) layer 202 performs data link layer functions related to the physical layer 201 such as access control and encoding data for transmission. The MAC sub-layer 202 also handles transmission timing, collision avoidance, and error detection duties.

Figure 3:
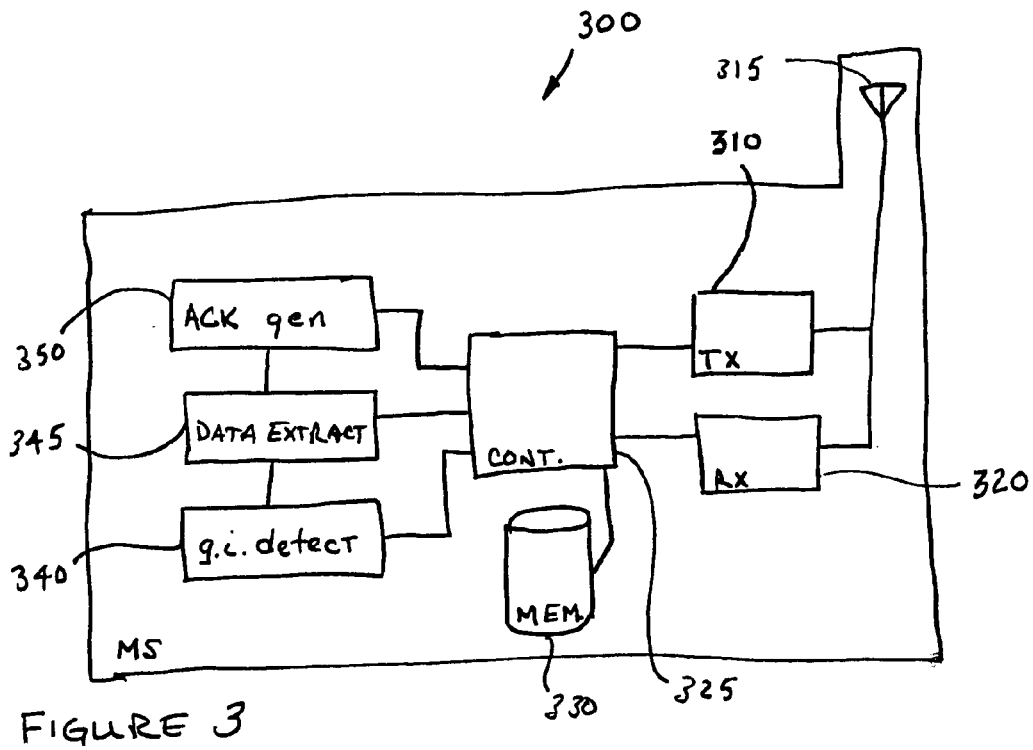
FIG. 3 is a simplified block diagram illustrating selected components of a mobile station operable according to an embodiment of the packet aggregation scheme of the present invention.

FIG. 3 is a simplified block diagram illustrating selected components of a mobile station 300 operable according to an embodiment of the packet aggregation scheme of the present invention. Mobile station 300 includes transmitter circuitry 310 and receive circuitry 320 operable to send and receive radio communications via antenna 315 under the direction of controller 325. A memory device 330 is available to store information as it is being processed and for longer term storage of data and applications.

In accordance with an embodiment of the present invention, mobile station 300 further includes a group indicia detector 340 for examining a received frame to determine whether the frame includes aggregated packets. In one embodiment, the group indicia detector 340 is able to detect any of a variety of differently formatted group indicia so that mobile station 300 is operable in different WLANs. In the embodiment of FIG. 3, mobile station 300 also includes a data extractor 345 capable of examining the header information to extract data in the received data frame that is addressed to the mobile station 300 and discarding other received data. Finally, mobile station 300 also includes an acknowledgment message generator 350 for generating an appropriate ACK. Naturally, acknowledgment generator 350 is operable to determine when an ACK (or NAK) is required, its format, and the time at which it should be sent.

Figure 4:
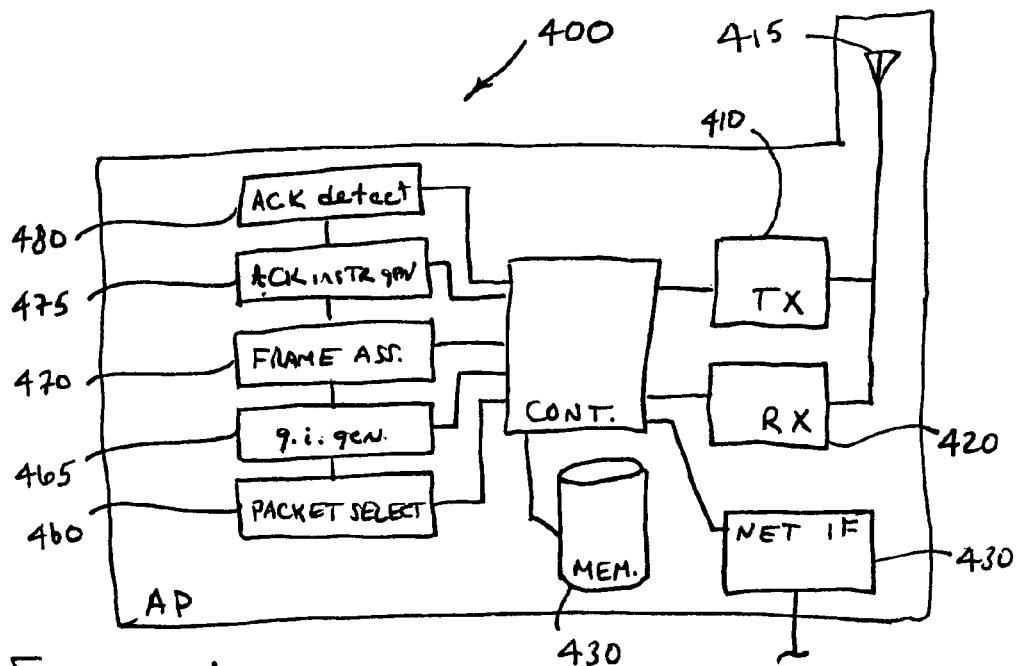
FIG. 4 is a simplified block diagram illustrating selected components of a WLAN access point operable according to an embodiment of the packet aggregation scheme of the present invention.

FIG. 4 is a simplified block diagram illustrating selected components of an access point 400 operable according to an embodiment of the packet aggregation scheme of the present invention. Access point 400 includes transmitter circuitry 410 and receive circuitry 420 operable to send and receive radio communications via antenna 415 under the direction of controller 425. Network interface 435 handles communications with infrastructure nodes (not shown). A memory device 430 is available to store information as it is being processed and for longer term storage of data and applications.

In accordance with an embodiment of the present invention, access point 400 further includes a packet selector 460 for determining which, if any, packets should be grouped together for a given transmission. Access point 400 also includes a grouping indicia generator 465 for generating indicia for informing recipients appropriate information regarding the transmission frame containing the aggregated data packets. Data frame assembler 470 constructs the data frame including the aggregated packets and the grouping indicia will include sufficient information so that each receiving station is able to extract the data intended for it. It may also include acknowledgment instructions so that each respective receiving station responds properly, generated by acknowledgment instruction generator 475. Finally, access point 400 includes an acknowledgment detector 480 for determining whether each respective recipient has received the data intended for it.

Figure 4A:
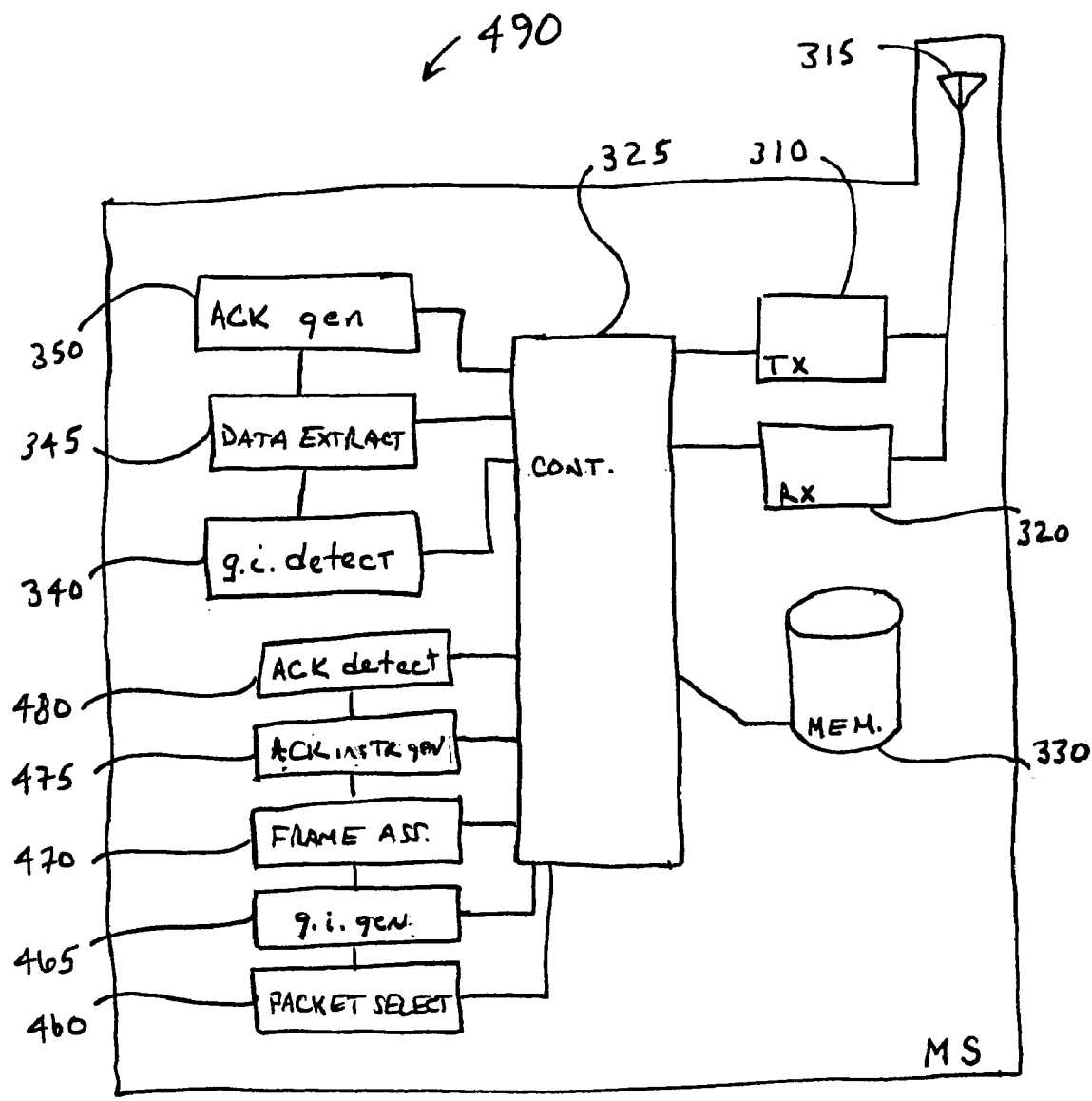
FIG. 4A is a simplified block diagram illustrating selected components of a WLAN access point operable according to another embodiment of the packet aggregation scheme of the present invention.

Some embodiments of the present invention are applicable to WLANs including at least one access point through which multiple stations may communicate As mentioned previously, however, the presence of an access point, fixed or otherwise, is not required in all embodiments of the present invention. In some applications, one station may act as an access point at some times and as an ordinary station at other times. In others, in IBSS mode for example, communication will take place without any station serving as an access point for the network. In this case, of course, the communicating stations will selectively include the functional components represented in both FIGS. 3 and 4 so that one or more of them may implement the present invention. FIG. 4A is a simplified block diagram illustrating selected components of a mobile station according to another embodiment of the present invention configured to work in such a manner. Note that components represented in FIG. 4A that are analogous to those of FIGS. 3 and 4 are numbered with the same reference numbers. this is for convenience, and does not imply that such components must be present in the same configuration in all embodiments. Note it is preferred that, in these various embodiments, stations operable to communicate according to any embodiment of the present invention are also able to communicate with stations that are not. Finally, note that mobile stations may use aggregation even when communicating with or through an access point, in which case there would be only a single recipient of the aggregated frames.

As the many stations in an If-BSS need to communicate over the same air interface (which usually but not necessarily includes one or more separate channels), some manner of permitting them to do so without interfering with each other must be provided. One method is to employ a large number of separate frequency channels so that each communication link may be assigned its own. The available bandwidth may not be sufficient for this solution, however, especially considering that similar frequency-channel allocation would also have to be provided for nearby BSSs in such a way as to avoid interference.

Another method is to provide for a "contention-free period", a method used in some WLANs. That is, in some WLANs, the various stations share a common radio channel (or channels), and therefore have to "contend" for it. Naturally, the individual stations are not always transmitting simultaneously, so often a given transmission may be sent and received without interference from competing transmissions. As the number of stations and amount of traffic increases, however, so does the likelihood that two or more stations will transmit at the same time (or at least close enough in time to interfere with each other's signal). A "contention-free period" addresses this problem because only one station is allowed to transmit in a given period. Of course, different stations are assigned different periods, according to a pre-determined assignment process.

Figure 5:
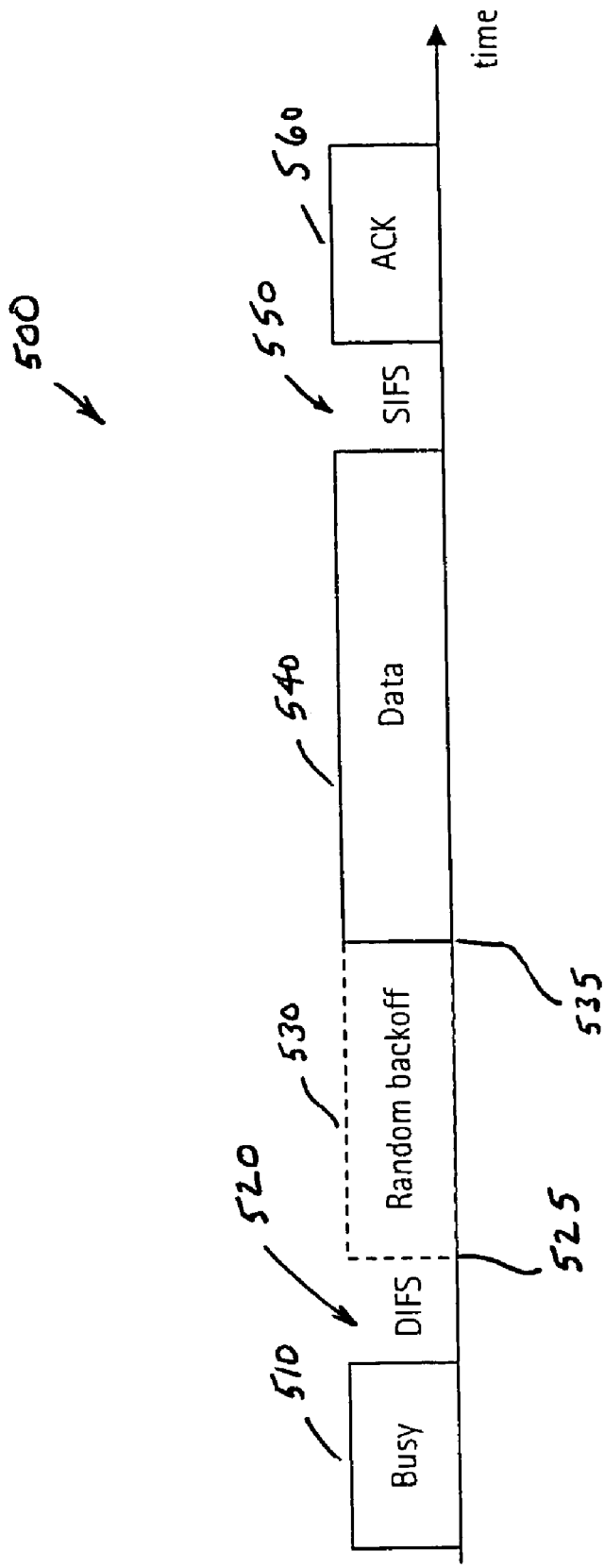
FIG. 5 is a time-flow diagram illustrating the contention-channel access cycle according to the prior art.

In a contention-based system, on the other hand, or in the contention-access period of a system using both, ways of avoiding interference are also employed. In general, no station transmits when it senses the intended channel is in use, and thereafter waits a certain time before attempting its own transmission. FIG. 5 explains this concept in more detail.

FIG. 5 is a time-flow diagram illustrating an exemplary contention-channel data-transmission sequence 500 according to the prior art. Sequence 500 is illustrated from the perspective of a WLAN station having data ready for transmission. Block (of time) 510 indicates that the medium is busy; that is, some other station is transmitting. After this other station has stopped transmitting, a station with data to transmit will wait a certain predetermined amount of time, called the distributed interframe space (DIFS) time 520. At some point 525 after the DIFS 520, the station attempts a data transmission. (Ordinarily, transmission attempt 525 will occur immediately upon the expiration of the DIFS 520, though this is not necessarily the case.)

Where two or more stations attempt to transmit over the same contention channel at roughly the same time, a "collision" occurs and neither transmission is successful. When a transmitting station senses a collision, it then waits for a random back-off period 530, before making the next transmission attempt 535. Note that if all stations whose transmission previously collided select a random delay before another attempt, it is most likely that their respective random back-off will vary sufficiently to avoid a subsequent collision. Even where no collision has taken place, a station ready to transmit will also typically wait for a random backoff period 530 if it detects the air interface is busy. Assuming no collision is detected at (transmission or) attempted retransmission 535, actual data transmission 540 can take place.

After data transmission 540, there is again a guard-time delay, here referred to as short interframe space (SIFS) 550. Following SIFS 550, and assuming that the data transmission was successfully received, an acknowledgment message (ACK) 560 is returned from the receiving station to the sending station. (Note that some stations, that is, those operating according to a different (non-WLAN) protocol, alternately employ a negative acknowledgment message (NAK) to indicate a lack of success.) Subsequent data transmissions (not shown) may then take place.

Figure 6:
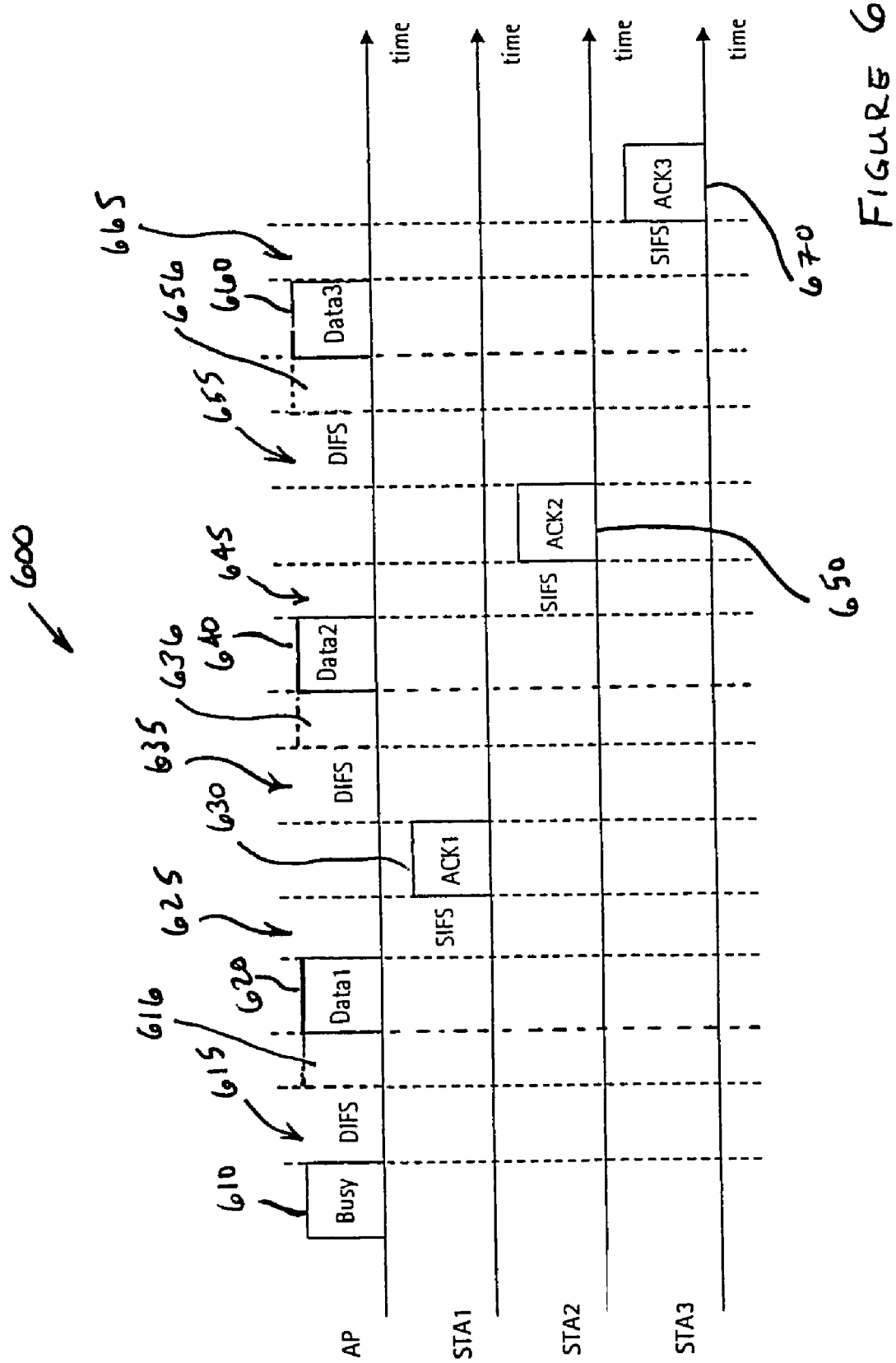
FIG. 6 is a time-flow diagram illustrating an exemplary contention-channel data-transmission sequence according to the prior art.

In the IEEE 802.11 scheme, the method generally described above is referred to as Carrier Sense Multiple Access with Collision Avoidance (CSMA/CA). One disadvantage of this system is that as traffic increases, collisions also increase and the amount of "overhead" time devoted to AIFS (or DIFS), SIFS, and random backoff may reach undesirable proportions. (This may be seen in FIG. 6.) FIG. 6 is a time-flow diagram illustrating an exemplary contention channel data-transmission sequence 600 according to the prior art. In this illustration, four stations are involved in the transmission sequence 600, an access point (AP) and three other stations enumerated $STA_1$ through $STA_3$. The access point has data to send to each of the three other stations. Just as in the scheme illustrated in FIG. 5, here the AP waits until the current transmission 610 is complete and delays further a first DIFS 615 before waiting a random backoff interval 616 and then initiating a first data transmission 620 (to $STA_1$). As before, the AP (and $STA_1$) then wait a first SIFS 625, after which $STA_1$ sends a first acknowledgement message ($ACK_1$) 630. After the completion of $ACK_1$, the AP then delays a second DIFS 635, a second random backoff interval 636, after which it initiates a second data transmission 640 (to $STA_2$). After a second SIFS 645, the second station will transmit its $ACK_2$ 650. Finally, following $ACK_2$ (block 650), and the expiration of a third DIFS 655 and random backoff interval 656, the AP transmits $Data_3$ (block 660) to $STA_3$ and waits (until after SIFS 665) to receive $ACK_3$ (block 670). Note that in networks using employing channel access according to IEEE 802.11e (not shown), the DIFS may be replaced by an AIFS (arbitration inter frame space). The AIFS is generally at least DIFS, and may be adjusted for different traffic categories.

As should be appreciated, a problem with the scheme, especially at higher traffic levels, is the increased amount of overhead time used only for SIFS, DIFS, and when it occurs, random backoff. In addition, each data transmission (blocks 620, 640, and 660 in FIG. 6) scheme generation and transmission of MAC-layer and physical-layer headers along with the data. This further burdens the limit channel with overhead, leaving relatively less time for actual data transmission. (Note that the present invention also attempts to reduce the physical-layer overhead burden as well.)

Figure 7:
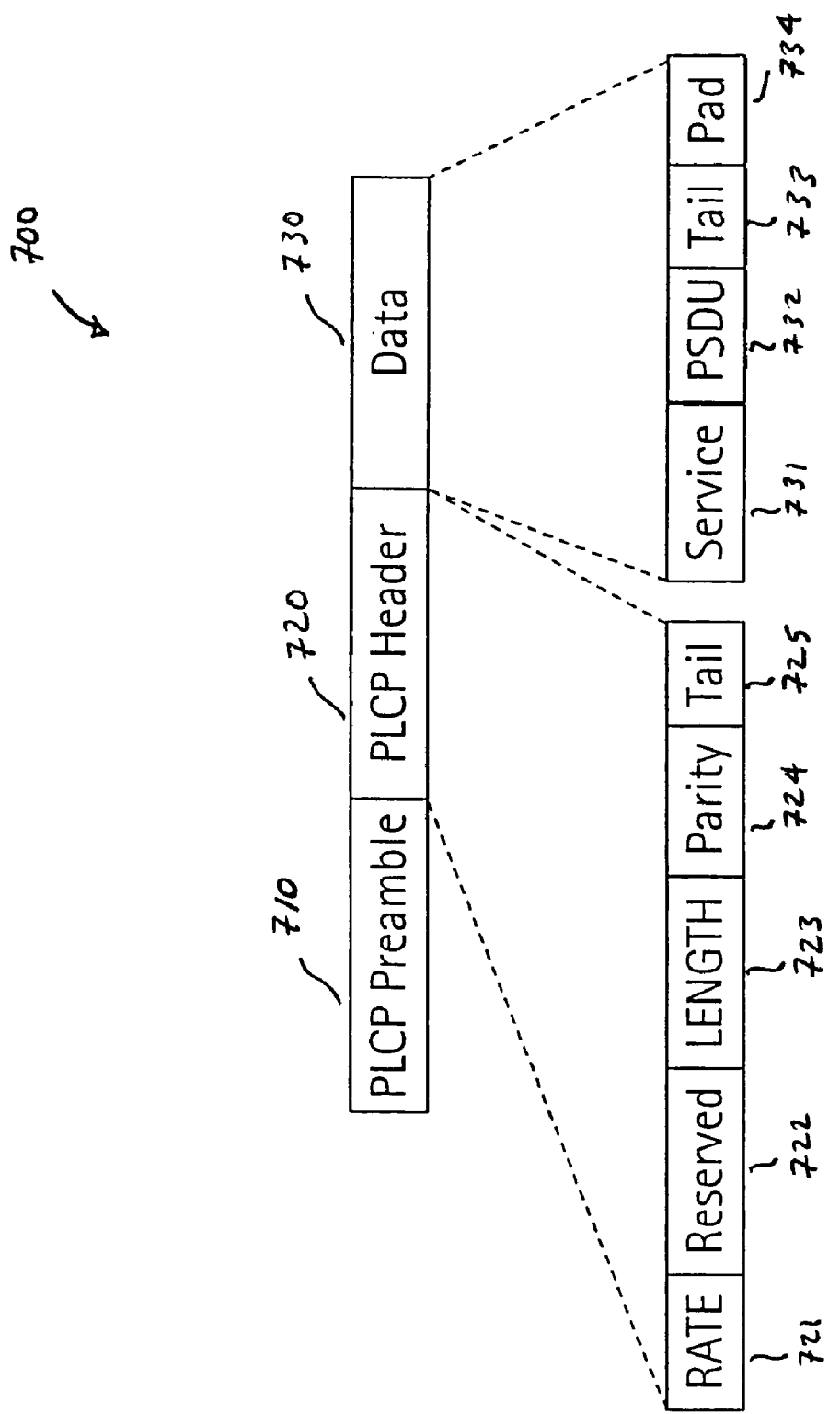
FIG. 7 is a block diagram illustrating a basic (IEEE 802.11a) frame format according to the prior art.

The physical-layer header, mentioned above, is part of the data-bearing transmission "frame". FIG. 7 is a block diagram illustrating a basic transmission frame 700 according to the prior art, in this case according to IEEE 802.11a. Frame 700 begins with a physical layer convergence procedure (PLCP) preamble 710 that is used for synchronization purposes. Note that each transmission frame must be synchronized. After the PLCP preamble 710 is the PLCP Header 720. As shown in FIG. 7, the PLCP Header 720 includes rate and length information, contained in fields 721 and 723, respectively, regarding the data to follow. Field 722 of Header 720 is a reserved field. The Header 710 also includes a parity field 724 and a Tail 725 at its termination. The data port 730 of frame 700 includes the actual data being transmitted, in PLCP service data unit (PSDU) 732, preceded by a Service field 731 and followed by a Tail 733. Padding 734 follows the Tail 733 as necessary. As mentioned above the PLCP header and preamble are according to the current IEEE 802.11a, but are exemplary only and subject to future revision.

To relieve the overhead burden in wireless communication systems such as this, a new transmission method is proposed. FIG. 8 is a time flow diagram illustrating a data-transmission sequence 800 according to an embodiment of the present invention. In this case, as in FIG. 7, it is presumed that an access point (AP) has data to send over a wireless channel to three different stations ($STA_1$ through $STA_3$). This presumption, however, is intended to be exemplary rather than limiting. In the embodiment of FIG. 8, the AP delays a first DIFS 815 after a previous transmission 810 is completed.

Following the DIFS 815, the AP waits a random backoff interval 816 and then transmits a transmission frame 820. In this embodiment, the frame 820 includes $Data_1$, $Data_2$, and $Data_3$, the data intended for stations $STA_1$, $STA_2$, and $STA_3$, respectively. Group transmission frame 820 also includes grouping indicia (not shown)—information to allow the separate stations to detect which data is intended for them. After the group frame 820 is transmitted, the stations in this embodiment respond in the order that the data was sent. That is, $STA_1$ transmits an $ACK_1$ 830 after waiting an SIFS 825 following transmission frame 820. In turn, $STA_2$ transmits an $ACK_2$ 840 after waiting a second SIFS 835, and $STA_3$ then waits on SIFS 845 before transmitting its $ACK_3$ 850. Naturally, the access point AP is able to distinguish between the three ACK messages to verify that each station successfully receives its data. If not, retransmit procedures are initiated (not shown), although the lost data need not be re-aggregated with the other (successfully received) data grouped together in transmission frame 820.

Figure 9:
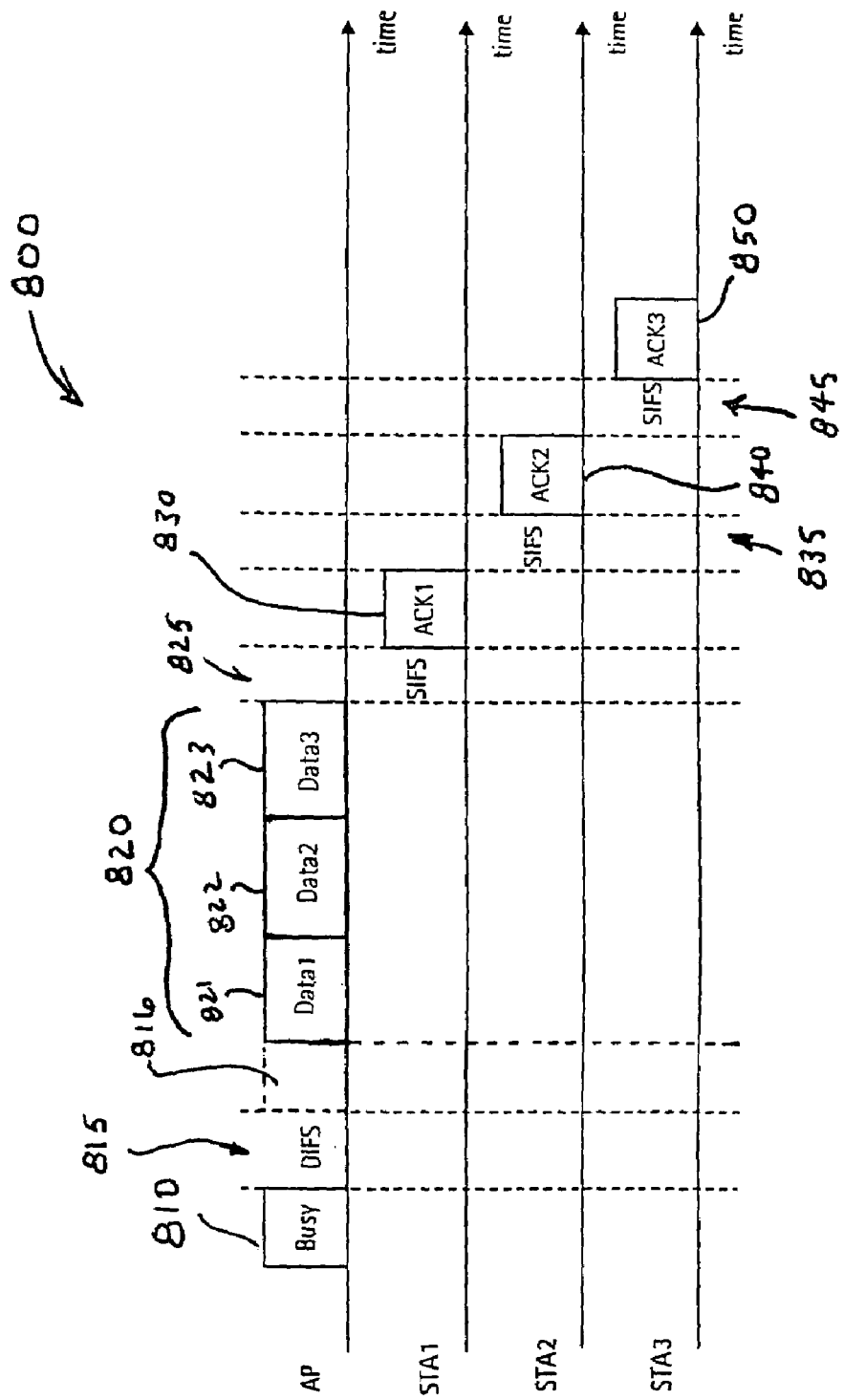
FIG. 9 is a block diagram illustrating a proposed frame format according to an embodiment of the present invention.
Figure 9:
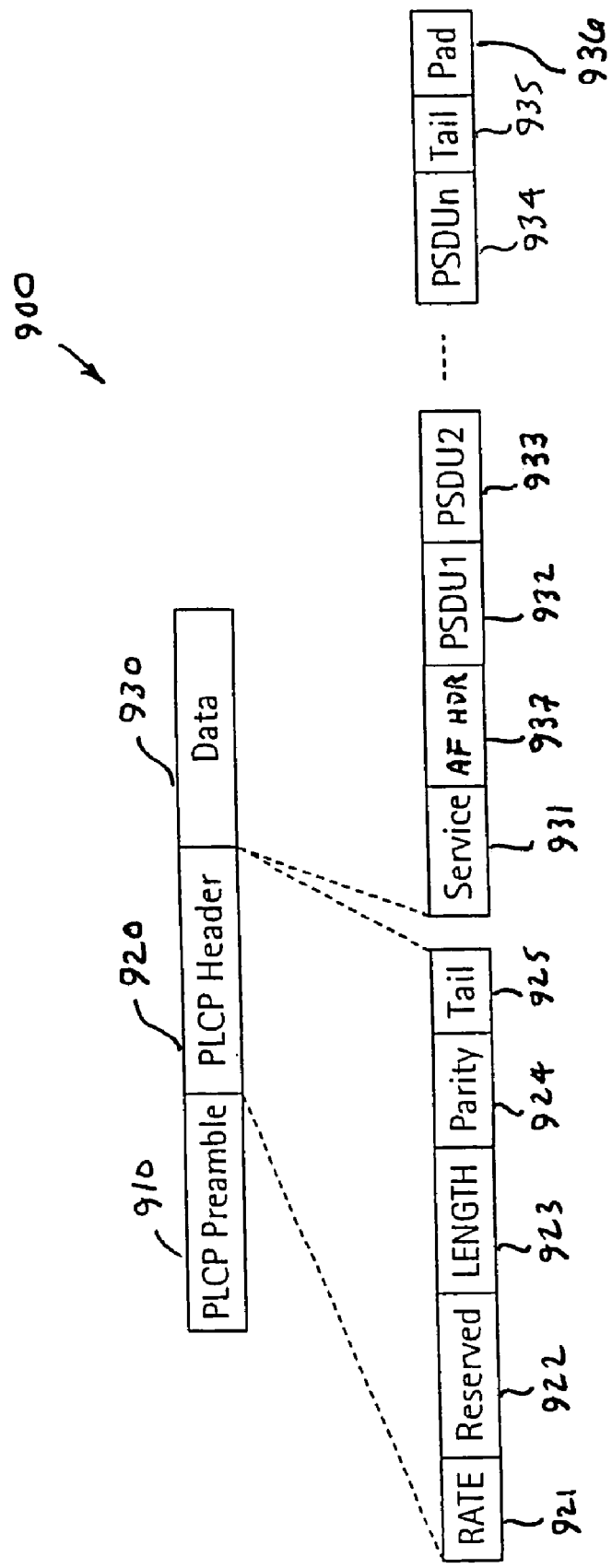

It should be apparent, when using the grouped transmission frame 820, a modified format will be used. This is not a disadvantage, however, as the header accommodating the group transmission frame 820 will replace the multiple use of a number of headers of the prior art, such as those illustrated in FIG. 7 and discussed above. While in a preferred embodiment of the present invention, the MAC headers remain intact an overhead savings is still realized as the PLCP header and PLCP preamble are transmitted less often. A grouped frame format for use with an embodiment of the present invention is shown in FIG. 9. FIG. 9 is a block diagram illustrating a proposed frame format 900 according to an embodiment of the present invention. As with the basic frame format of FIG. 7, the group frame format begins with a PLCP preamble 910 that is used for frame synchronization (by each of the intended receiving stations). Following the PLCP preamble, is a PLCP header 920. In this embodiment of the present invention, the PLCP header 920 again contains a Rate field 921, a Length field 923, a Parity field 924, and a Tail 925. Field 922 between Rate field 921 and Length field 923 is reserved.

Figure 1:
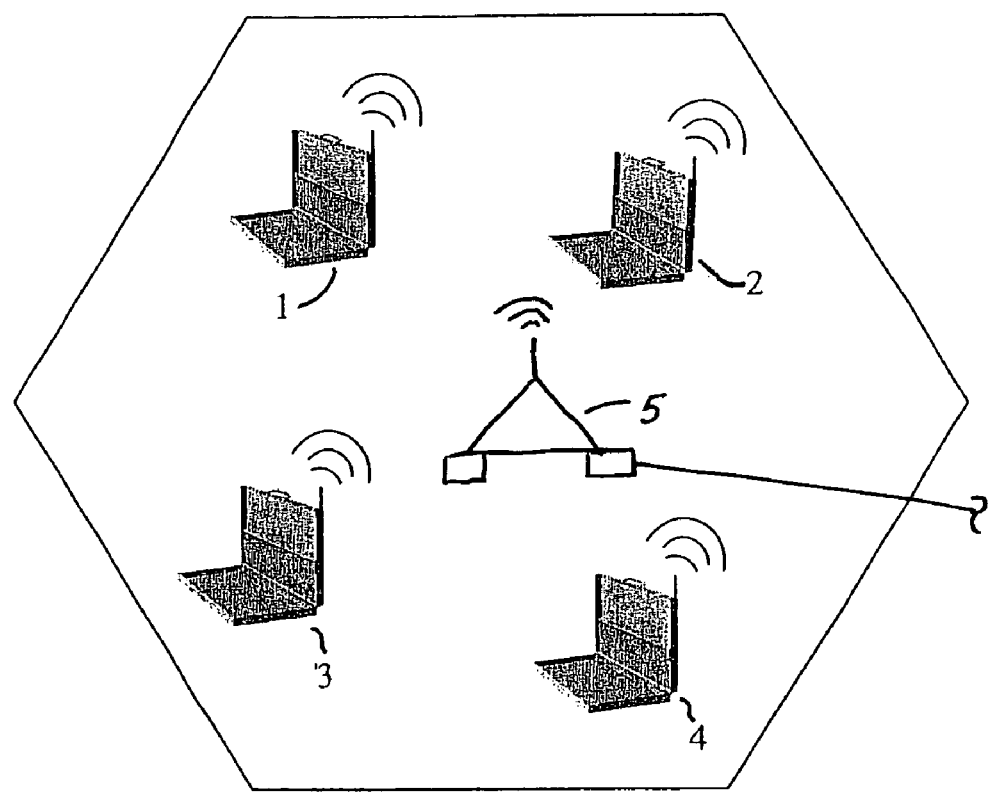
FIG. 1 is a simplified block diagram illustrating selected components of an exemplary network, here a wireless local area network (WLAN), in which the present invention may be advantageously implemented.

Following the PLCP header 920 is the actual transmitted data 930. In the frame 900, illustrated in FIG. 9, the data fields for each of the intended recipients are labeled $PSDU_1$ 932, $PSDU_2$ 933, and $PSDU_N$ 934. Each of these data units is intended for one (or more) of the intended receiving stations, such as stations 1 through 4, shown in the If-BSS of FIG. 1. As should be apparent from the illustration, any number of data units may be inserted into a frame, up to the limits of a given system. (There may be practical or design-preference limitations, of course.) The data portion 930 of group frame 900 begins with a Service field 931 and ends with a Tail 935 and, if necessary, padding 936. Aggregation Frame (AF) header 937, in this embodiment, is between Service field 931 and $PDSU_1$ 932 and includes aggregation control information.

Figure 17:
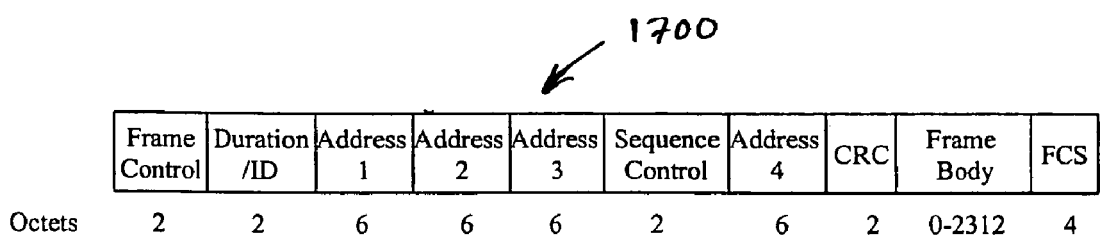
FIG. 17 illustrates the basic MAC frame format.

When using the group frame format according to the present invention, it is necessary to indicate to the receiving stations which data field contains data intended for them. This provision of grouping indicia may be done in a variety of ways, such as simply including the receiver address, or including a simple transmission map. In one embodiment of the present invention, for example, a transmission map may be created when the data packets to be aggregated are selected for group transmission, and the transmission map may, for example, be inserted between (with reference to FIG. 9) the PLCP header 920 and the data portion 930 of the group frame format. In one embodiment of the present invention, a subtype field in the MAC header may be used to indicate a grouped transmission, with the type field set to "data". (A basic MAC frame format is shown in FIG. 17, including a cyclic redundancy check (CRC) used to protect the MAC header part according to an embodiment of the present invention.)

FIG. 18 illustrates the format of an aggregated frame 1800 according to an embodiment of the present invention. Aggregated frame 1800 includes an aggregated frame control part 1801. FIG. 19 illustrates the contents of the aggregation frame control field 1901. Note that in the illustrated embodiment, aggregation frame control field 1901 begins with the same fields as are present in the current IEEE 802.11 frame control field to achieve backward compatibility. The Length field indicates the number of DA fields in the aggregation frame control field. In addition, settings in some of the fields, may have certain values when operating in accordance with the present invention.

FIG. 20 is a table 2000 illustrating values for the Subtype field in accordance with the present invention. FIG. 21 is a table 2100 illustrating values for encoding the Duration/ID field according to an embodiment of the present invention. When setting the Duration/ID field in the aggregation control field, it is preferred that the Duration/ID field are set to the time required to send all of the aggregated data in the aggregated frame plus all ACKs and SIFSs required to complete the exchange. The number of ACKs and SIFSs, for example, is the number of MPDU/MMPDUs if all are targeted to different mobile stations. If multiple data units are sent to one station, then only one ACK from that station is required and the duration value can be shortened accordingly. In setting the Duration/ID field in OFDMA, an adjustment is also made for the reduced number of ACKs required.

Finally, FIG. 22 is a table 2200 illustrating values for the DA field content according to an embodiment of the present invention. Note that the content of the DA field corresponds to Address 1 of the MPDU or MMPDU field, that is, DA#1 includes the MPDU#1 Address 1 field. In this embodiment, if the Subtype field has a value of 0000, then only the DA#1 field is present. In the case of a DA indicating a broadcast or multicast address, the receiver also validates the BSSID from the actual aggregated MPDU/MMPDU. It is preferred that broadcast, multicast, and no-ACK MPDUs be sent in the last aggregated frame in order to minimize channel time for the exchange.

In general, the grouping indicia associated with the group frame, such as the frame 900 illustrated in FIG. 9, will include an indication that the frame does, in fact, contain multiple data packets potentially intended for different recipients, and some information for use by the receiving stations to determine which data transmissions are actually intended for them. In addition, the grouping indicia may contain information related to the method of generating and transmitting and acknowledgment method that should be used. Where such instruction are present, the advantage gained is illustrated by the difference between the time flow diagram of FIG. 6 and the time flow diagram of FIG. 7. Rather than leaving it to each receiving station to generate and transmit an ACK after waiting an SIFS following the end of the data transmission, these stations will be instructed to acknowledge in the order that the information was transmitted (and presumably, received). In another embodiment, by design the ACKs are simply sent in the order that the frames were aggregated, or in some other pre-determined sequence. In the event that one or more ACKs are missing, such as when data was incorrectly received or the STA was out of range, then the STAs properly receiving their data simply ACK in the proper time slot.

Referring to the time flow diagram of FIG. 8, for example, the grouping information in or associated with Frame 900 will include instructions for STA1 to send its acknowledgment message (ACK$_1$) after waiting an SIFS after the completion of the data transmission. Stations STA$_2$ and STA$_3$, in turn, would again wait a standard delay time before sending their acknowledgment messages ACK$_2$ and ACK$_3$, respectively. An adjustment is preferably provided for, wherein the second station, for example, would send an acknowledgment message (ACK$_2$) after a certain predetermined time period has elapsed even if STA$_1$ is for some reason unable to send ACK$_1$. In one embodiment, the STA$_2$ in this situation would include in its acknowledgment message ACK$_2$, an indication that it waited unsuccessfully for the transmission of ACK$_1$, and finally send its own acknowledgment.

Figure 16:
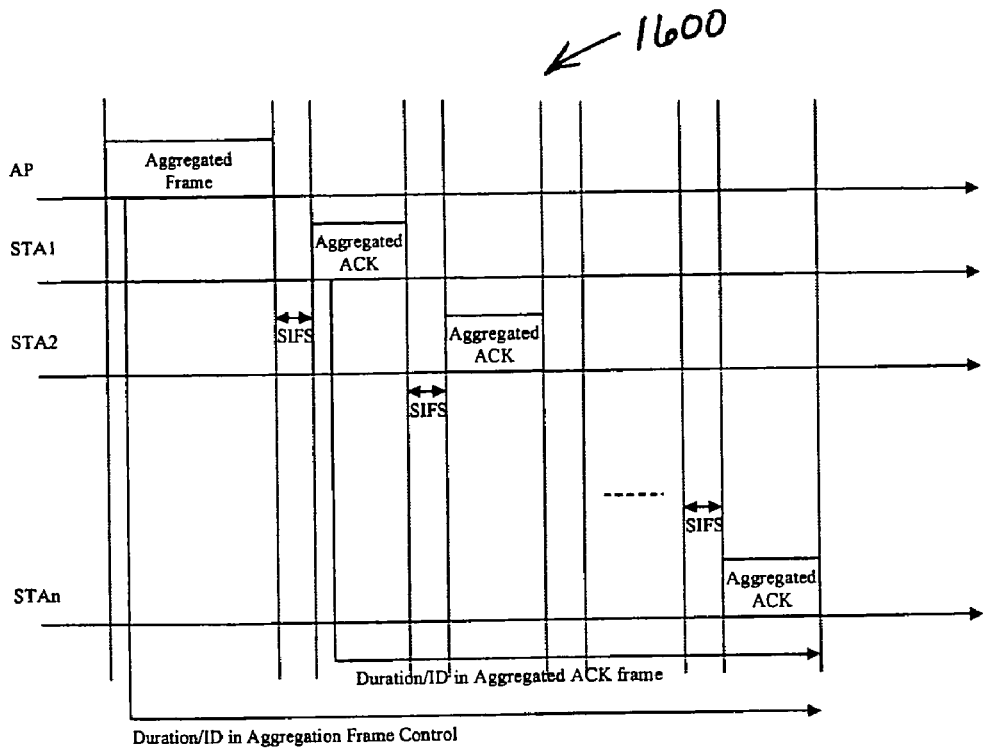
FIG. 16 is a time flow diagram illustrating an aggregated-data transmission sequence according to another embodiment of the present invention.

FIG. 16 is a time flow diagram illustrating an aggregated-data transmission sequence 1600 according to another embodiment of the present invention. Note that in this embodiment, each STA returns an aggregated ACK if it has correctly received the data destined for it. The data may, for example, be in the form of MAC protocol data units or MAC management protocol data units (MPDU/MMPDU). If multiple data units are sent to a single receiving STA, then only a single ACK is required (and other STAs may adjust their ACK timing accordingly). Preferably, a duration value in the Aggregation Frame Control field points to the end of the entire frame exchange sequence, as illustrated in FIG. 16. A duration value of each of the individual Aggregated ACKs may also point to the end of the entire frame exchange sequence, with the last Aggregated ACK duration value set to 0.

Where multiple recipient stations are contemplated, the transmission speed will be at least as slow as the speed of the slowest station. In one embodiment, however, packets may be selected for inclusion into a transmission frame based at least in part on the capabilities of the intended recipients so that where possible lower speeds do not have to be used to communicate with stations capable of higher speeds solely because of the manner in which packet groups are selected.

As mentioned above, this method of the present invention is useful in a wireless communication system that employs a contention-access scheme (or contention-access period). It is also useful, however, in contention-free schemes, for example IEEE 802.11 PCF (point coordination function) and HCCA (HCF (hybrid coordination function) controlled channel access—IEEE 802.11e). Such communication systems may use a variety of protocols. The method of the present invention is especially advantageous when used with a wireless communication system that employs orthogonal frequency division multiplexing (OFDM). In OFDM, data symbols are mapped into a relatively large number of subcarriers, or frequency bins, for transmission by taking an inverse fast Fourier transform (IFFT) to create a time domain signal. Each frequency bin is orthogonal with respect to the others so that they do not (at least in the ideal case) interfere with each other. At the receiver, the time domain signal is converted back to a frequency domain signal using a fast Fourier transform (FFT) so that the originally transmitted information signals can be detected. OFDM makes more efficient use of the available spectrum than most other methods, and therefore may transmit more data using a given transmission bandwidth.

In such a system, the multiple stations in a WLAN communicating with a single access point used in orthogonal frequency division multiple access (OFDMA) when transmitting. In a preferred embodiment of the present invention, the stations use a group frame transmission ACK scheme when acknowledging receipt of a group frame (such as the frame 900 illustrated in FIG. 9) containing aggregated packet data. The acknowledgment scheme described above (with reference to FIG. 8) represents an improvement over the prior art, but is in some instances not optimal because each ACK is still an individual message containing all of the required overhead, such as headers for synchronization.

Naturally, the individual receiving stations that receive transmitted group frames, such as group frame 900, cannot aggregate their acknowledgments. Each station only has the information it needs for generating its own acknowledgment message. The responding stations will therefore generally (although, perhaps, not universally) be able to assemble group frames for transmission to the access point. Even in WLANs that include individual stations capable of aggregating packet data for transmission, such stations will not usually be able to aggregate acknowledgments for return to the transmitting station, except in special cases.

Figures 24, 25:
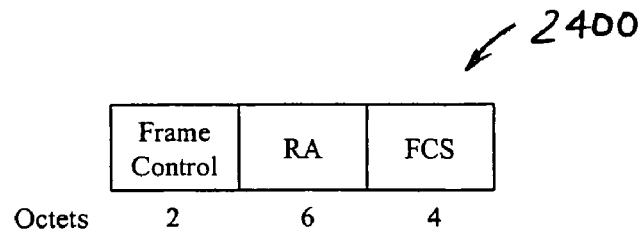
FIG. 24 illustrates the format of an OFDMA ACK frame 2400 according to an embodiment of the present invention.
FIG. 25 is a table providing subcarrier allocations for aggregated OFDMA ACK messages in accordance with an embodiment of the present invention.

FIG. 23 is a time flow diagram 2300 illustrating an aggregated frame exchange with an aggregated OFMDA ACK in accordance with an embodiment of the present invention. After the OFDMA ACK, the network returns to the normal channel access procedure. If one or more ACKs are not correctly received, the transmitter, may simply use a backoff and retransmission procedure. FIG. 24 illustrates the format of an OFDMA ACK frame 2400 according to an embodiment of the present invention. In this embodiment, the RA field is the same as the Address 2 field of the corresponding MPDU/MMPDU. If multiple MPDU/MMPDUs are send to a single receiver, the receiver sends an equal amount of aggregated OFDMA ACK frames back (assuming reception was successful).

As mentioned above, the subcarrier allocations for a network may be determined in advance. FIG. 25 is a table 2500 providing subcarrier allocations for aggregated OFDMA ACK messages in accordance with an embodiment of the present invention. In an alternate embodiment (not shown), the assignments may be made when the aggregated data is transmitted.

In this embodiment, in order to overcome the disadvantages of other methods, each intended recipient is assigned a subset of the OFDM subcarriers for transmission of its own individual acknowledgment message (ACK). The separate ACKs transmitted by the recipient stations therefore arrive at substantially the same time at the access point, where they can be interpreted. A method for processing received acknowledgments of this type will now be described.

Figure 10:
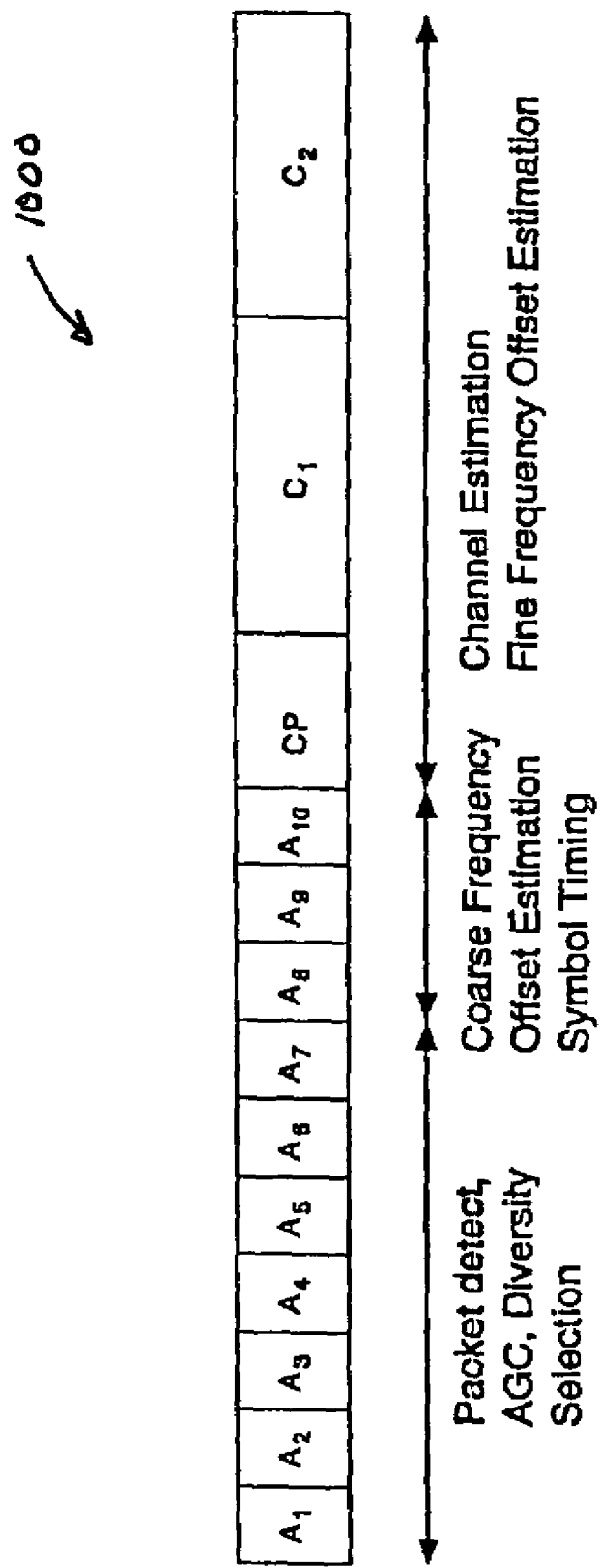
FIG. 10 is a block diagram showing, in general, a preamble structure for use in wireless data transmission.

First, the preamble structure for networks such as those operating according to the IEEE802.11 standard will need to be modified. For reference, this preamble structure is illustrated in FIG. 10. FIG. 10 is a block diagram showing, in general, a preamble structure 1000 for use in wireless transmission. In preamble 1000, illustrated fields $A_1$ through $A_7$ are used for packet detect information, AGC, and diversity selection. Fields $A_8$ through $A_{10}$ contain course frequency offset estimation and symbol timing information. And Field CP and $C_1$ and $C_2$ contain information for channel estimation and fine frequency offset information. In accordance with the present invention, the preamble structure would use the same short training symbols. Packet detection, frequency synchronization, and time synchronization can be performed in the normal fashion once the edge of the packet is detected. In packet detection, the periodicity of the short training symbols at the start of the preamble is used to detect the edge of the receive packet via a delay and correlate algorithm.

Mathematically the algorithm is described as:

$$C_n = \sum_{k=0}^{L-1} r_{n+k} r^*_{n+k+D} \tag{1}$$

-continued $$p_n = \sum_{k=0}^{L-1} \|r_{n+k+D}\|^2 \tag{2}$$

where D=16 for preambles constructed according to IEEE 802.11A and IEEE 802.11G standards, and $r_n$ is the received signal. Then the decision statistic $m_n$ is calculated as:

$$m_n = \frac{|c_n|^2}{|p_n|^2} \tag{3}$$

Figure 11:
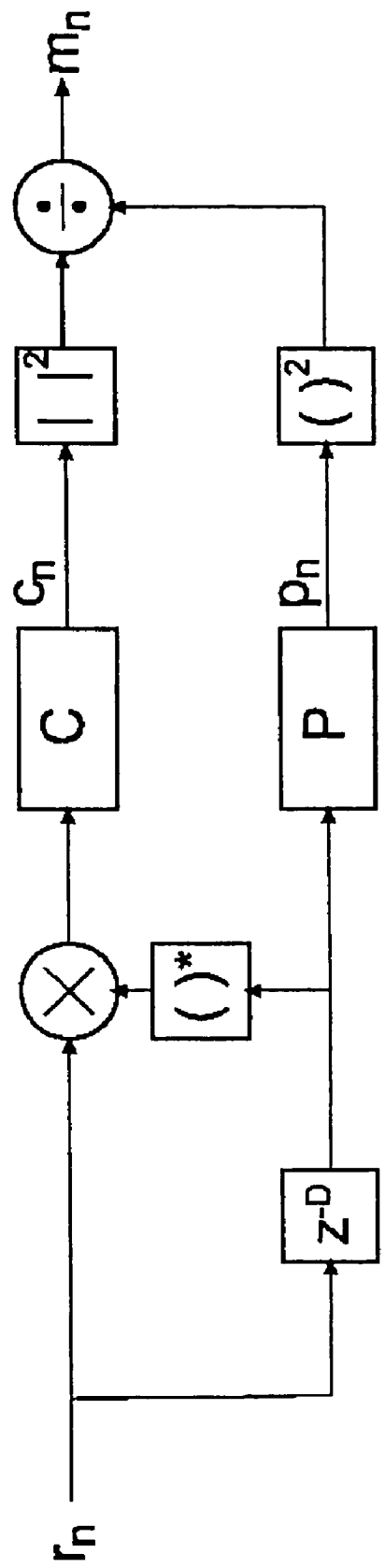
FIG. 11 is a signal flow diagram illustrating the structure of the Delay and Correlate Algorithm.
Figure 12:
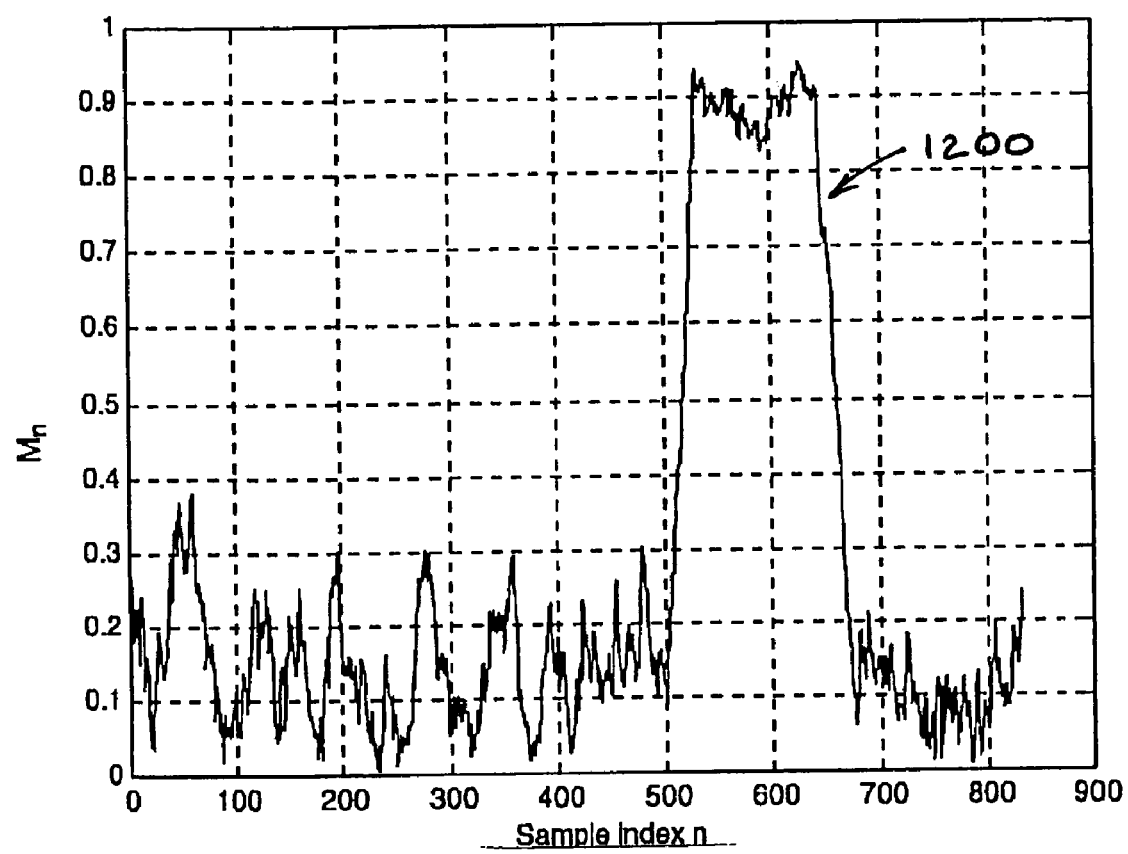
FIG. 12 is a graph illustrating the response of the delay and correlate packet detection algorithm of FIG. 11.
Figure 13:
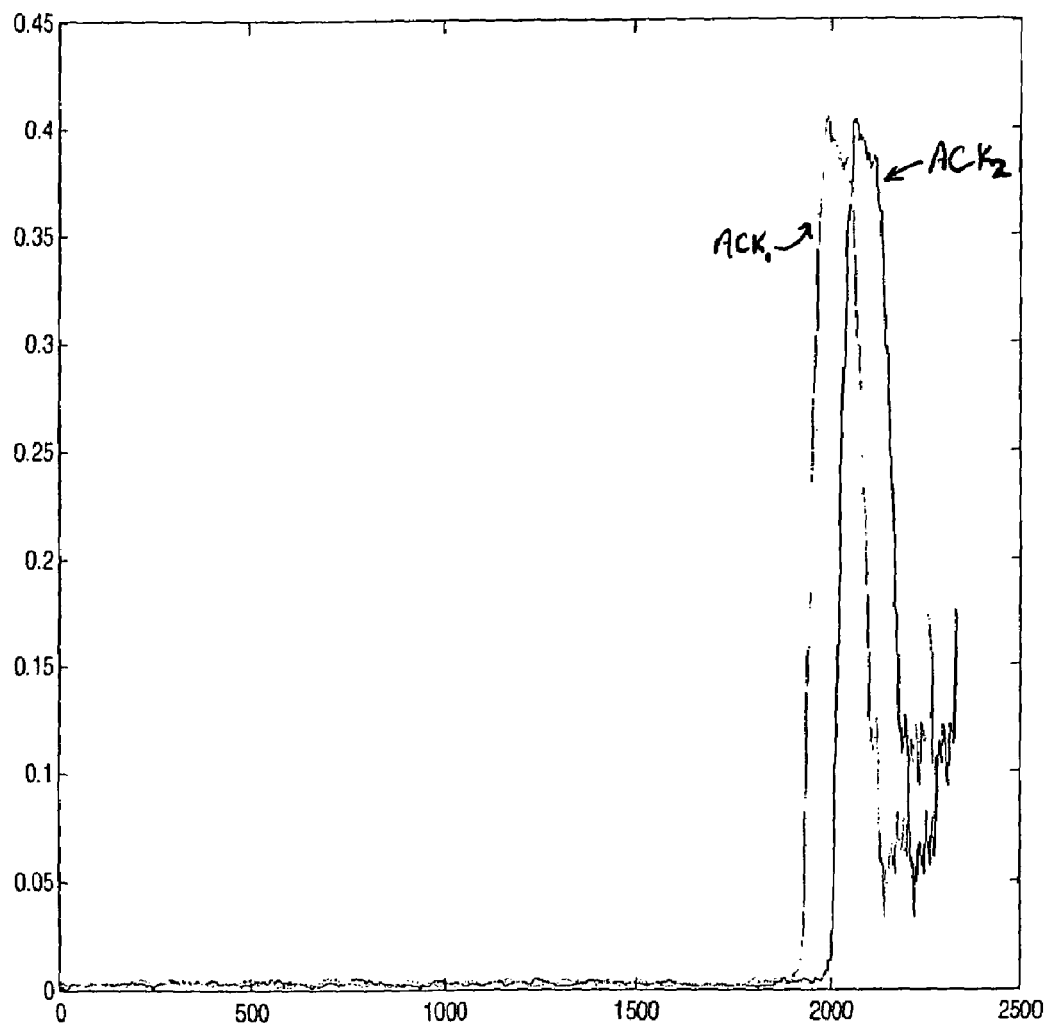
FIG. 13 is a graph illustrating separate ACK detection.
Figure 14:
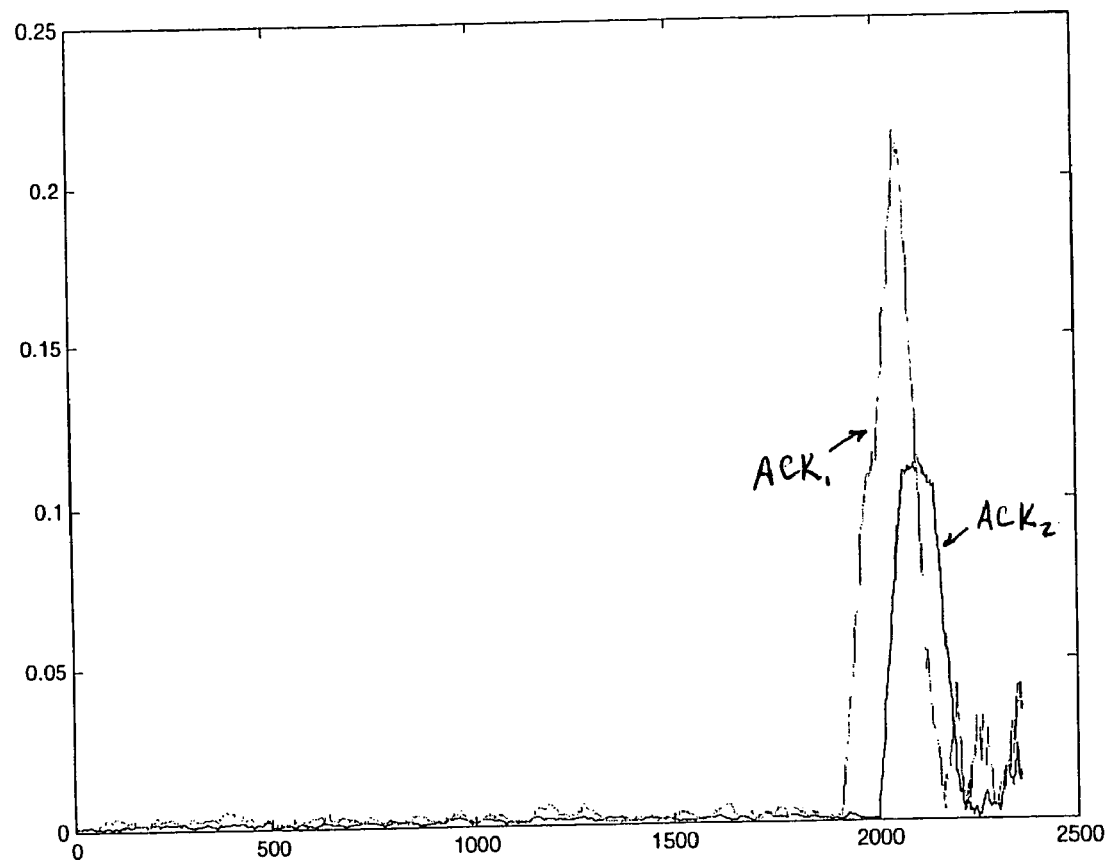
FIG. 14 is a graph illustrating joint ACK detection.

An exemplary signal flow for this algorithm is shown in Figure$_{13}$. FIG. 10 is a signal flow diagram illustrating an exemplary structure for the delay and correlate algorithm of the present invention. The normalization by $(p_n)^2$ forces the overall response to lie between [0, 1] as illustrated in the graph of FIG. 12. FIG. 12 is a graph illustrating the response of the delay and correlate packet detection algorithm of FIG. 11. In accordance with the present invention, however, the arrival of the last packet needs to be detected. FIGS. 13 and 14 illustrate the difference between separately detecting two ACKs and the combined ACK of the present invention. Referring to FIG. 14, the proper edge for the last arriving packet occurs at the peak. In accordance with the present invention, the normalization factor has been removed to allow the decision threshold to exceed infinity. Once the packet is detected, the received signal may be expressed as:

$$r_n = r(nT_s - T_{OFFSET}) \tag{4}$$
$$T_s = kT_{SYS}$$
$$T_{OFFSET} = \frac{[0, 1, \ldots, k-1]}{k} T_{SYS}$$

where k is the oversample factor for the system clock $T_{SYS}$. In one embodiment, $T_{SYS}$ operates at 60 MHz, building an oversample factor of k=3 since the IFFT/FFT runs at 20 MHz sampling. $T_{OFFSET}$ is chosen such that the error due to the actual delay (a random variable) is minimal. In this event, the largest $T_{OFFSET}$ can be as $T_{SYS}/2$. Simulated results have shown that the intercarrier interference (ICI) generated by this quantization by the symbol timing is negligible. The relative delay, however, between arriving packets is bound by:

$$D_{max} = \lceil 2R/cT_s \rceil \tag{5}$$

where R is the support radius in meters of the DSS, C is the speed of light, and $T_s$ as previously defined (see equation 4).

The total receive signal $r_n$ is given by:

$$r_n = \sum_{i=1}^{} h_i \otimes X_{n+D_i} \tag{6}$$

due to the cyclic prefix, the convolution shown in equation 6 between the transmitted signal for each station and its corresponding channel impulse response (CIR) is circular. This is required to exploit the well known Fourier transform property of the equivalence of multiplication in the frequency domain and convolution in the time domain.

Figure 15:
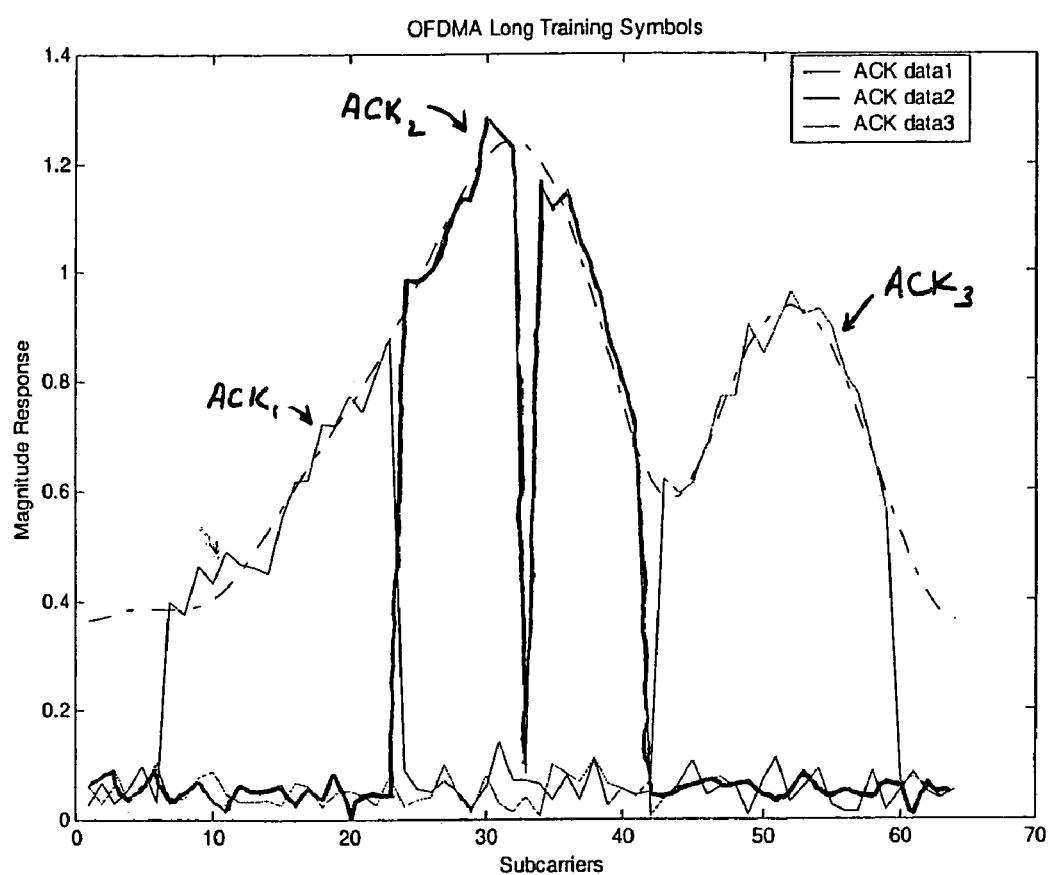
FIG. 15 is a graph illustrating an exemplary OFDMA training for separate channel estimations.

Again, based upon Fourier transform properties, each of the delays causes a phase shift in the frequency domain. These phase shifts need to be estimated in the frequency domain. According to this embodiment of the present invention, the long training symbols are modified for this purpose. The long training symbols are designed to excite fifty-two subcarriers of the IFFT/FFT as illustrated in FIG. 15. Each station transmits the portion of the long training symbols that excite the cluster of subcarriers assigned in the OFDMA scheme. In this way, the phase associated with each delay is estimated for the subcarriers of interest. Detection with the clusters of channel estimation is performed in the normal fashion.

The assignment of subcarriers for IEEE 802.11a and IEEE 802.11g is provided below:

TABLE 1

Subcarrier Assignment for Data and pilot Tones for 64 Pts IFFT

|        | 1 ACK         | 2 ACKs  | 3 ACKs        | 4 ACKs  | 5 ACKs   | 6 ACKs  |
|--------|---------------|---------|---------------|---------|----------|---------|
| User #1 | [7:32 34:59] | [7:32]  | [7:23]        | [7:19]  | [7:15]   | [7:15]  |
| User #2 | N/A          | [34:59] | [24:32 34:42] | [20:32] | [16:24]  | [16:24] |
| User #3 | N/A          | N/A     | [43:59]       | [34:46] | [25:32]  | [25:32] |
| User #4 | N/A          | N/A     | N/A           | [47:59] | [34:42]  | [34:42] |
| User #5 | N/A          | N/A     | N/A           | N/A     | [43:51]  | [43:51] |
| User #6 | N/A          | N/A     | N/A           | N/A     | Not used | [52:59] |

Note that since it is only necessary to determine if data was sent or not, it is sufficient to test each cluster of subcarriers for whiteness or discrete alphabet determination. The inherent structure of the long training symbol can facilitate this process in the frequency domain by exploiting the delay in correlation of the signal structure. In an alternative embodiment, a simple whiteness test over the cluster of subcarriers can be performed since a station that does not correctly detect its packet does not transmit an ACK message. In this embodiment, channel estimation performed in the frequency domain uses a 1-tap equalization operation over each subcarrier.

The previous descriptions are of preferred examples for implementing the invention, and the scope of the invention should not necessarily be limited by this description. The scope of the present invention is defined by the following claims.

What is claimed is:

1. In a wireless communication system operable to communicate packetized data according to a channel access protocol, an improved method of communicating the data packets, said method comprising the steps of:
    forming, in a transmitting station, the data to be transmitted into a plurality of packets;
    selecting a group of packets for aggregate transmission from the plurality of packets;
    creating grouping indicia associated with the selected packet group in the transmitting station, the grouping indicia being indicative of the recipients of each of the packets and identifying different recipients for at least two packets of the same packet group; and
    assembling at least one transmission frame including the selected packet group and the grouping indicia.

2. The method of claim 1, wherein the data to be transmitted includes medium access control (MAC) layer headers having a plurality of fields, and further comprising the step of setting the MAC layer header fields.

3. The method of claim 1, wherein the data to be transmitted includes physical layer headers having a plurality of fields, and further comprising the step of setting the physical layer header fields.

4. The method of claim 1, further comprising the step of transmitting the transmission frame.

5. The method of claim 1, further comprising the step of receiving the transmission frame in at least one receiving station.

6. The method of claim 5, further comprising the step of determining, in the at least one receiving station, whether the received transmission frame includes grouping indicia.

7. The method of claim 6, further comprising the steps of:
    decoding the received transmission frame; and
    extracting from the decoded frame data addressed to the at least one receiving station.

8. The method of claim 7, further comprising the step of discarding extracted data, if any, that is not addressed to the at least one receiving station.

9. The method of claim 6, further comprising the step of generating, in the receiving station, an acknowledgment message (ACK).

10. The method of claim 9, further comprising the step of determining whether the grouping indicia includes ACK instructions prior to generating the ACK.

11. The method of claim 10, wherein the step of generating an ACK message is performed according to the ACK instructions, if any.

12. The method of claim 11, wherein the acknowledgment instructions include information relating to the timing of ACK transmission.

13. The method of claim 12, wherein the information relating to ACK timing is derived front the order in which data packets are assembled in the transmission frame.

14. The method of claim 11, wherein the wireless communication system is operable according to an orthogonal frequency division multiple access (OFDMA) protocol, and wherein the ACK instructions include an ACK subcarrier set assignment, wherein the ACK subcarrier set is a cluster including a subset of the subcarriers used for transmissions according to the OFDM protocol.

15. The method of claim 11, further comprising the step of receiving at least one ACK message from a receiving station.

16. The method of claim 15, wherein the at least one ACK message is a plurality of ACK messages.

17. The method of claim 16, wherein each of the plurality of ACK messages occupy a unique ACK subcarrier set.

18. The method of claim 17, further comprising the step of using a delay and correlate algorithm to detect the individual ACKs of the plurality of ACKs.

19. The method of claim 17, farther comprising the step of using a whiteness test to detect the individual ACKs of the plurality of ACKs.

20. In a radio station operable to communicate in a wireless communication system, an improvement of apparatus for the communication of data packets, said apparatus comprising:

a transmitter in a first wireless station;

a packet selector for determining which data packets are to be grouped together for transmission;

a grouping-information generator for generating indicia of the packet grouping, the grouping indicia being indicative of the recipients of each of the packets and identifying different recipients for at least two packets of the same packet group;

a transmission frame assembler for assembling a transmission frame including the selected packets and the grouping indicia;

wherein the assembled transmission frame is presented to the transmitter for transmission to at least a second wireless station.

21. The apparatus of claim 20, wherein the wireless communication system is a wireless local area network (WLAN).

22. The apparatus of claim 21, wherein the WLAN is operable according to an OFDMA protocol.

23. The apparatus of claim 22 wherein the first wireless station is a WLAN access point (AP).

24. The apparatus of claim 23, wherein the at least a second wireless station is a plurality of wireless stations.

25. The apparatus of claim 24, wherein the transmission frame includes packets addressed to different ones of the plurality of wireless stations.

26. In a wireless communication system operable to communicate packetized data according to a channel access protocol, an improved method of communicating the data packets, said method comprising:

forming the data to be transmitted into a plurality of packets;

selecting a group of packets for aggregate transmission from the plurality of packets;

creating grouping indicia associated with the selected packet group; and assembling at least one transmission frame including the selected packet group and the grouping indicia, wherein at least two of the data packets in the group of packets are intended for different recipients.

* * * * *

UNITED STATES PATENT AND TRADEMARK OFFICE
CERTIFICATE OF CORRECTION

PATENT NO.        : 7,120,852 B2                                         Page 1 of 1
APPLICATION NO. : 10/880379
DATED             : October 10, 2006
INVENTOR(S)       : Terry et al.

It is certified that error appears in the above-identified patent and that said Letters Patent is hereby corrected as shown below:

<u>Column 16,</u>

Line 51, "front" should read --from--.

<u>Column 17,</u>

Line 4, "farther" should read --further--.

Signed and Sealed this

Twentieth Day of March, 2007

JON W. DUDAS
*Director of the United States Patent and Trademark Office*